Aug. 4, 1964  O. H. MILMORE  3,143,395
METHOD OF OPERATING A FLUID MIXER WITH ROTATING BAFFLES
Filed July 14, 1959  2 Sheets-Sheet 1
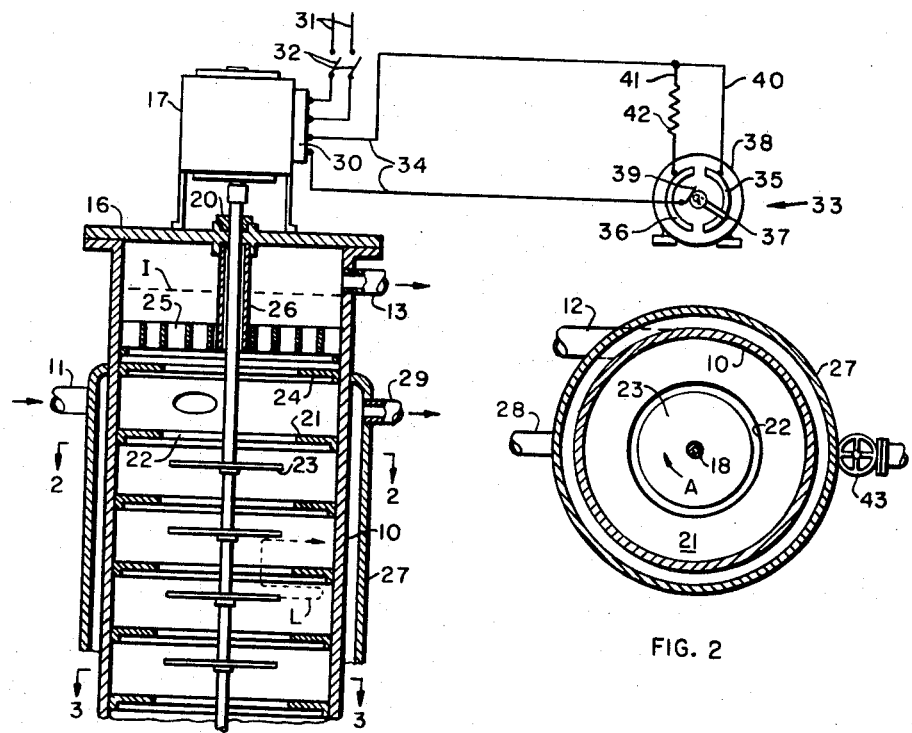
FIG. 1
FIG. 2
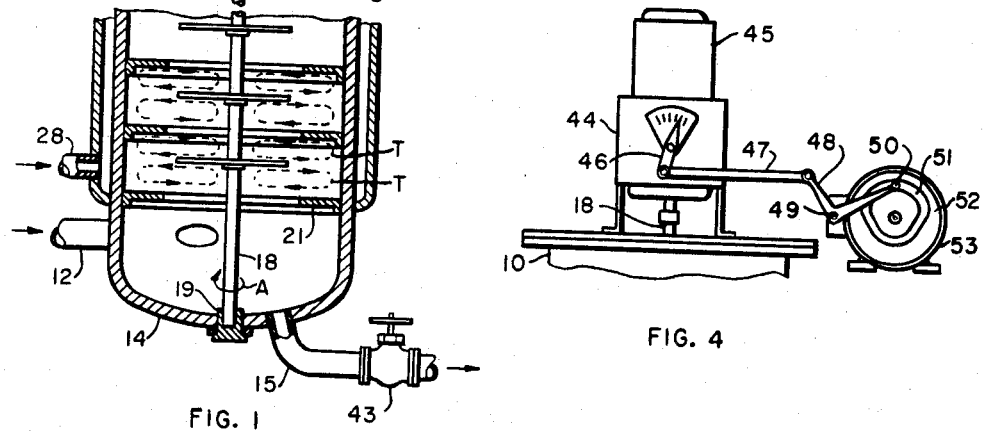
FIG. 4
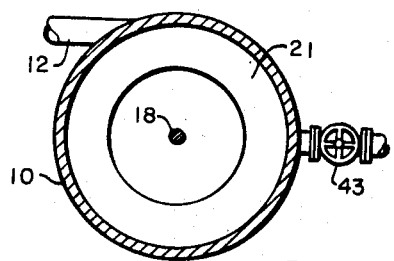
FIG. 3
INVENTOR:
Oswald H. Milmore

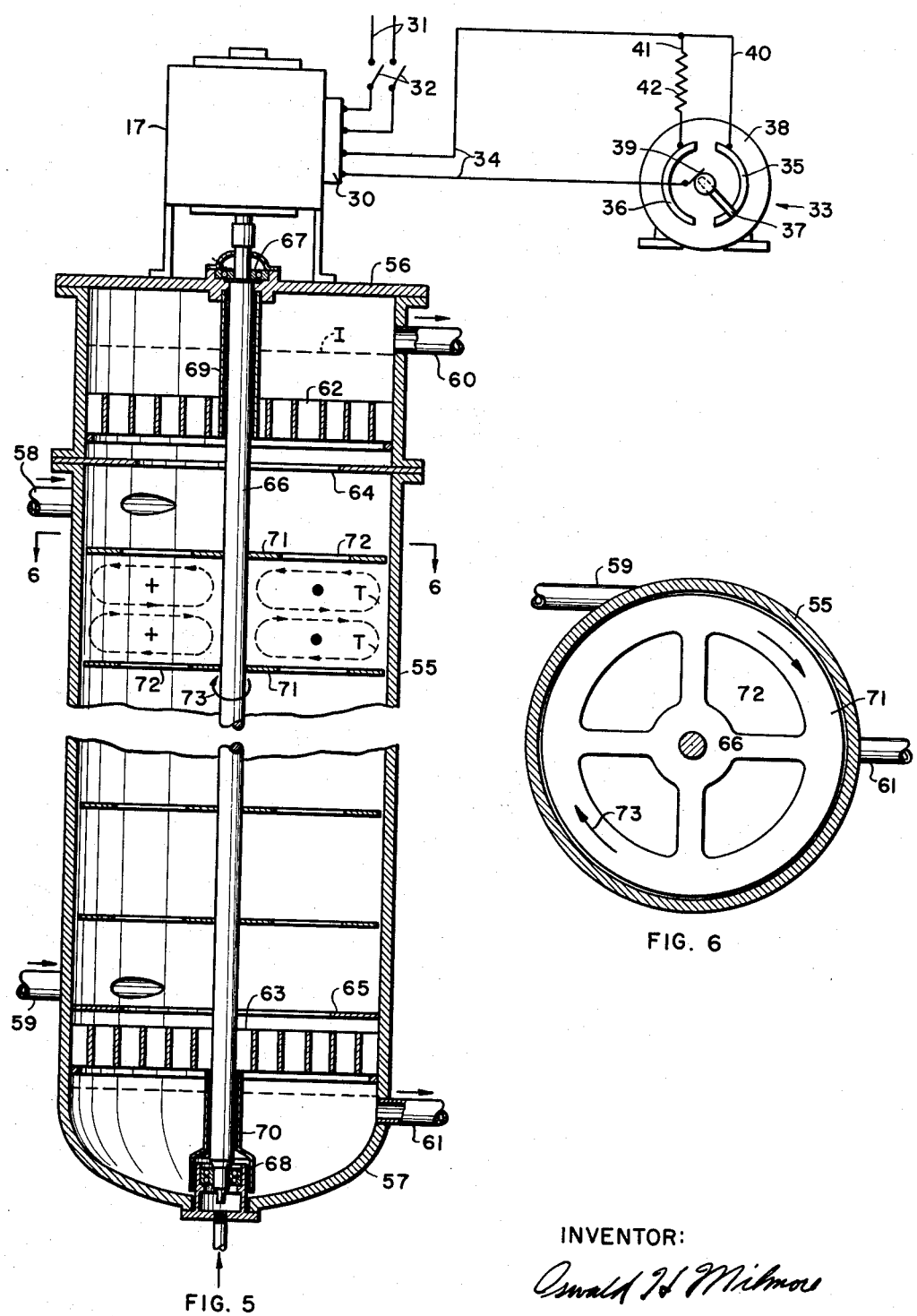

United States Patent Office 3,143,395
Patented Aug. 4, 1964

3,143,395
METHOD OF OPERATING A FLUID MIXER WITH ROTATING BAFFLES
Oswald H. Milmore, Piedmont, Calif., assignor to Shell Oil Company, a corporation of Delaware
Filed July 14, 1959, Ser. No. 827,989
7 Claims. (Cl. 23—310)

This is a continuation-in-part of my application Serial No. 657,839, filed May 8, 1957, now abandoned.

This invention relates to internally baffled, multistage fluid mixing apparatus suitable, for example, as reactors or as contacting apparatus to effect intimate contact between two or more at least partially immiscible fluid phases. When used as a reactor a single fluid phase may be passed through the several stages; the device is then a homogeneous reactor. However, several phases may be flowed through the reactor concurrently. When used as a contacting device, e.g., to effect chemical reactions or for solvent extraction, two phases are present, and usually flow countercurrent through the several stages. All applications are herein generically referred to as fluid mixing apparatus.

Mixing apparatus of this type includes an elongated, usually vertical vessel which contains a rotor comprising a shaft and carrying fast for rotation therewith a plurality of transverse, generally flat rotor baffles spaced along the shaft and subdividing the shell into compartments or mixing zones which are in serial communication. In a common embodiment the shell further contains a series of transverse stator baffles having aligned openings and mounted at intervals, between the rotor baffles and in axially spaced relation thereto, although such stator baffles may in some instances be omitted. Such apparatus is sometimes known as a rotating disc contactor. The general principles of construction and operation and the vortex patterns created by the baffles when used as a contactor are disclosed in U.S. Patents Nos. 2,601,674, 2,729,544 and 2,729,545.

As is more completely set forth in the cited patents, the rotor baffles produce within the several compartments vortex patterns which cause one phase to be dispersed intimately within the other, and the dispersed and continuous phase gravitate into adjoining compartments in accordance with their relative densities. Such gravitating flow is satisfactory when the operation involves reasonably balanced net rates of flow of the two phases countercurrently through the vessel. In some operations, however, the net or throughput rate of flow of one of the phases, either the dispersed or the continuous one, is insufficient to maintain a composition gradient through the series of compartments when known constructions of the apparatus are used. For example, it was found that when one phase flows only intermittently or very slowly, such as at one-tenth of the flow rate of the other, excessive axial mixing occurs. The composition of the slowly moving phase then tends to become or becomes uniform throughout the several compartments, so that the contactor is in effect operating at a very small number of stages or as a single stage; this phenomenon occurs although the same contactor can be operated at a larger number of theoretical stages with the identical ratio of phases present within the vessel but with increased flow of the above-mentioned phase. The difficulty is especially severe in fluid systems that are difficult to mix; in such cases high mixing intensities produced, e.g., by high rotor speeds, are necessary and promote equalization of the composition throughout the several compartments.

The situation of low net rate of flow of one phase, considered in the preceding paragraph, is met with whenever a fluid stream is treated with a disproportionately smaller volume of a treating fluid, e.g., when hydrocarbon oil is treated with sulfuric acid or gasoline is treated with caustic.

Axial mixing is also a problem when the device is used as a reactor wherein only one phase occurs or wherein several phases flow concurrently, since any passage of fluid counter to the main flow direction results in unequal residence times for different parts of the reaction mixture.

It is a general object of the invention to overcome or mitigate the above-noted difficulty by controlling the rotor speed in such a way as to limit axial fluid mixing. Specific objects are to limit back-mixing of the slowly moving phase and thereby to increase the number of theoretical contacting stages realized in internally baffled apparatus of the type indicated used as a contacting apparatus when the rate of throughput of one phase is excessively low in relation to the rate of throughput of the other phase and when a high mixing intensity is required; and to limit back-mixing of the fluid passing through the vessel when used as a homogeneous or concurrent-flow reactor so as to effect a more uniform residence time.

In summary, according to the invention the general object is attained by operating the rotor alternately at relatively higher and lower speeds sufficient to maintain the mixture of fluids within the apparatus as a dispersion. This method of operation may be performed by manually controlling the rotor speed, e.g., by changing the speed of the drive motor or the speed ratio of a variable speed drive between the motor and rotor shaft in a cyclic or periodic way. However, means may be provided to execute such changes automatically.

The invention is founded on the observation that the tendency of a phase, such as the slowly-moving phase in a contacting operation, to become uniform throughout the series of contacting compartments is due to back-mixing, in which some of the said phase flows between compartments in the reverse axial direction, i.e., toward the end of the vessel at which it was admitted and contrary to its settling direction. When this axial mixing occurs at a rate that is high in relation to the net rate of flow or throughput rate of the phase in question, the composition is more or less equalized among all or several compartments. The rate of axial or back-mixing can be expressed in terms of the inter-compartment fluid inter-mixing rate, which is defined as the ratio of the reverse flow of a given fluid phase between adjacent compartments to the net forward flow of said phase through the vessel. In general, high mixing intensities, associated with high rotor speeds, result in higher intercompartment mixing rates. Low rotor speeds, although causing reduced back-mixing, have heretofore caused undesirably low mixing intensities. It is evident that the same condition prevails in the case of a uniflow reactor; here reverse flow leads to a wider spread between the maximum and minimum residence times within the reactor.

The instant invention purports to maintain good mixing intensities or contacting conditions within the compartments during the entire cycle of consecutive high-speed and low-speed operations, although the mixing intensity may vary somewhat as is described below, while effectively limiting back-mixing, by repetitively correcting certain detrimental conditions which are brought about during high-speed operation. At high rotor speeds good contacting is caused by two principal effects, viz., (1) a high degree of turbulence and (2) increased surface area between the fluid phases due to the subdivision of the dispersed phase into small drops and to a greater holdup. Turbulence promotes back-mixing. Now if the rotor speed is suddenly decreased the turbulence fluctuations and, with them, the back-mixing are reduced immediately; however, the contacting may remain quite good for a considerable period of time, depending upon the properties of the fluids, because it takes time for the small drops to coalesce to form larger ones and for holdup to change. The invention is, therefore, especially useful for systems that coalesce slowly. Even for those systems in which coalescence is rapid, however, the cyclical operation of the rotor speed is effective when back-mixing is a severe problem, although then the contacting effectiveness falls off more rapidly during reduced-speed operation and this period should be shortened. Hence, periodically reducing the rotor speed for a limited period, followed by high-speed operation continues effective contacting while reducing back-mixing.

From another point of view the operation according to the invention may be regarded as periodically increasing the rotor speed above a lower speed. It is known that for many systems the rate of extraction (i.e., the rate of transfer of components between phases tending toward equilibrium) is highest during the formation of drops and the creation of a new interface. Therefore, in the period immediately following an increase in rotor speeds, during which large, unstable drops (produced by coalescence at the previously low rotor speed) are breaking up into smaller ones, the extratcion rate may be the highest. Because back-mixing is undesirably increased during this period the duration of this high-speed operation is restricted by reducing the speed soon after small drops have been formed.

Further particulars regarding the selection of the rotor speeds and the manner of varying the rotor speeds are presented in the sequel, wherein the invention is described with reference to the accompanying drawing forming a part of this specification and showing certain preferred specific embodiments by way of example, wherein:

FIGURE 1 is a vertical sectional view of the contacting apparatus constructed in accordance with the invention;

FIGURES 2 and 3 are transverse sectional views taken on the lines 2—2 and 3—3, respectively, of FIGURE 1;

FIGURE 4 is a fragmentary elevation showing an alternative construction of the variable speed drive;

FIGURE 5 is a vertical sectional view of a modified contacting vessel to which the invention is applied; and FIGURE 6 is a transverse sectional view taken on the line 6—6 of FIGURE 6.

Referring to FIGURES 1, 2 and 3, the vessel includes a vertical cylindrical wall 10, circular in cross section, having upper and lower inlet pipes 11 and 12, respectively, which may optionally be tangential, as shown, an upper discharge pipe 13 and, in the bottom wall 14, a lower discharge pipe 15. The vessel is closed by a top plate 16 carrying a variable-speed electric motor 17 which is coupled to a vertical shaft 18. This shaft is rotatably mounted in bearings 19 and 20. A plurality of stator baffles 21 is mounted immovably within the vessel at suitable intervals, which are equal in this embodiment. These baffles are imperforate except for aligned openings 22, which are large in relation to the cross section of the shaft. The baffles divide the vessel into a vertical series of compartments which communicate consecutively through said openings. Although the invention is not restricted thereto, the drawings show the baffles in their preferred construction, i.e., flat and annular and mounted horizontally and having the central openings 22 circular in shape and concentric with the central axis; in this arrangement the shaft 18 is also disposed at the central axis. The shaft 18 carries fixed thereto a plurality of rotor baffles 23 which, in the preferred form, are flat, circular, imperforate discs, the shaft and rotor baffles together constituting the rotor. The diameters of the openings 22 may be equal, as shown; similarly, the baffles 23, may have diameters which are equal but somewhat smaller than the said openings so that baffle 23 can be passed through the openings; however, these features are not in every case essential to the invention. A stator baffle 24 and a current-suppressing element such as an egg-crate structure 25 may be optionally mounted above the inlet 11. Further, a tube 26 may surround the upper part of the shaft 18. The vessel may have a jacket 27 fitted with pipes 28 and 29 for the circulation of a heating or cooling fluid.

Considering now the improvement according to this embodiment of the invention, the motor 17 is of the type adapted to be operated at different speeds and provided with a mechanism for periodically changing the speeds. One example of this type is a wound-rotor A.C. motor having the field winding thereof connected through a terminal strip 30 to a constant-potential supply circuit 31, controlled by the switch 32, and the armature winding connected to the said supply circuit by way of a controller 33 by a circuit 34. The controller includes a two-sector contactor having electrically conducting segments 35 and 36 which are situated in different sectors so as to be alternately wiped by a contact arm 37 connected to a constant-speed motor-driven programmer 38 the operating speed of which is preferably adjustable. One side of the circuit 34 is connected to the arm 37 through a brush 39 and the other is connected in parallel via a lead 40 to the segment 35 and via a lead 41 to one terminal of an electrical resistance element 42 the other terminal of which is connected to the segment 36. It is evident that when the arm 37 is in contact with the segment 35 the circuit 34 is short-circuited and full voltage is applied to the motor armature winding, resulting in operation at high speed; when the arm is in contact only with the segment 36 the resistance 42 is interposed in this circuit, resulting in the application of a reduced voltage to the winding and, hence, a reduced motor speed.

Operation as a contactor is as follows: It is assumed that the heavier fluid is to form a continuous phase and that the lighter fluid is to be dispersed therein. The column is filled through inlet 11 with the heavier fluid, the shaft 18 is rotated by the motor 17 in a direction indicated by the arrow A, FIGURE 2 (this being preferably the same as the tangenitial direction of the inlet ports 11 and 12), and the lighter fluid is admitted continuously or intermittently through the inlet 12, the admission of heavier fluid at 11 being continued. Toroidal vortices T are thereby set up within each compartment, resulting in the dispersion of the lighter fluid in the heavier. The greater part of the dispersion is recirculated within the vortices and the balance gravitates from stage to stage. Thus, the net path for a particle of lighter fluid between compartments is as indicated by the dashed line L. These flow pattern are further described in the above-cited patents. The relatively quieter space beneath the lowermost baffle 21 contains only the heavier fluid, commingled above the inlet 12 with large bubbles or globules of the lighter fluid. The heavier fluid is discharged through the outlet fluid at a rate controlled by the valve 43. The dispersion rising past the upper inlet 11 has the rotational movement thereof checked by the structure 25; this permits the dispersed droplets to settle above the interface I. The lighter fluid is withdrawn through the outlet 13 and the heavier fluid settles back through the structures 25, so that there is no net vertical flow thereof at this level.

As was noted earlier, when the rotor operates at a speed sufficient to attain good contacting by forming many small drops and producing turbulence, and especially when one of the fluid phases flows slowly or intermittently, back-mixing, i.e., axial mixing thereof in the reverse direction, would tend to equalize among the several compartments the composition of that phase when the rotor baffles are operated at rotor speeds sufficient for good mixing without special measures against back-mixing. This tendency, occurring during the periods of high-speed operation (while the arm 37 makes contact with the segment 35), is counteracted during periods of reduced-speed operation (while the contact arm makes contact only with the segment 36). During the latter periods the rotor speed is so low that the turbulent fluctuations are reduced and back-mixing is sharply reduced or stopped so that the dispersed lighter phase can settle upwards and the continuous, heavier phase can settle downwards; however, the rotor speed is preferably maintained sufficiently high to maintain the dispersion throughout the column and prevent stratification of the phases.

The relative durations of the high-speed and reduced-speed operating periods can be varied by selecting the relative sizes of the sectors subtended by the segments 35 and 36, while the frequency of the cyclic or periodic speed changes can be varied by changing the speed of the programmer 38. The maximum speed of the motor is determined by the characteristics of the motor when the full potential applied to the armature winding and the reduced speed is determined by selecting an appropriate resistance 42, as is well understood. These variables are all selected to achieve the desired results in accordance with the properties of the system.

The upper limit of the rotor speed is substantially equal to that speed which would flood the column if high-speed operation were continued indefinitely, herein called "flooding speed"; however, flooding does not actually occur because of the long time (often a matter of hours in large-diameter columns) required to cause flooding in relation to the high-speed operation practiced in accordance with the invention. Speeds from about 0.85 to 1.1 of flooding speeds will be normally used as the high speeds. Such a flooding speed may be determined empirically or may be calculated by employing methods known in the art. The lower limit of the rotor speed is about one-twentieth of flooding speed or a speed such that the rotor peripheral velocity is 2 ft. per sec., whichever is higher. Advantageously the lower rotor speed is less than one-half of the high speed, preferably about one-twentieth to one-fifth of the flooding speed. The invention is not, however, limited to the use of such a great change in speed.

The duration of the high-speed period is preferably only that required to break up the dispersed phase into droplets of equilibrium sizes; this duration would, therefore, depend upon the properties of the fluids, the rotor diameter and the rotor speed; in most instances it is from about 5 seconds to one minute.

The duration of the low-speed period should be as long as possible consistent with maintenance of an acceptable rate of mass-transfer between the phases. It is usually about one-half to twenty times as long as the high-speed period (equal periods being indicated in FIGURE 1 only by way of example). In no case, however, would any benefit be obtained from times which exceed the nominal residence time of the slower phase, i.e., of the phase which moves through the column at the lower rate. (The nominal residence time of the dispersed phase in the length of the column divided by the product of the superficial velocity and the holdup of that phase; the nominal residence time of the continuous phase is the length of the column divided by the product of the superficial velocity and the binominal one minus the dispersed phase holdup, i.e., $L \div U_c(1-h)$, where L is the length of the column, $U_c$ is the superficial velocity of the continuous phase and $h$ is the holdup of the dispersed phase.)

It is desirable that the changes in rotor speed, especially that from high-speed to low-speed, occur rapidly.

While the foregoing description pertained to the dispersal of the lighter fluid, it is evident that the invention is equally applicable to the case where the heavier fluid is dispersed and the interface I is at the bottom, as is disclosed in the aforementioned patents. In this case dispersion of the heavier fluid is effected by admitting it only after the vessel has been filled with the lighter fluid; the column is then inverted, so that the baffle 24 and current-suppressing structure 25 are at the bottom.

It may be further noted that the invention may be applied to contactors of various forms, including particularly those with streamlining bodies or flat guide rings, in accordance with the above U.S. Patents, Nos. 2,729,544 and 2,729,545, respectively.

Referring to FIGURE 4, the rotor shaft 18, projecting from the top of the column 10 as previously described, is coupled to the output side of a variable-speed transmission unit 44, such as a continuously variable gear box of known or suitable design. The unit 44 is mounted on the column 10 and has the input side thereof coupled to an electric motor 45 which may in this instance be a constant-speed motor. The unit 44 has a control lever 46 by which the gear ratio can be varied. This lever is pivotally connected to one end of a rod 47 the other end of which is connected to a bell-crank lever 48 having a pivotal mounting at 49 and carrying a cam follower 50. The follower 50 engages the margins of a groove 51 of a timing face cam 52 which is driven by a programmer 53 at a constant speed which is preferably adjustable.

It is evident that rotation of the cam 52 causes the control lever 46 to move back and forth in a periodic manner to vary the speed of the shaft 18 in a like periodic manner when the motor 45 is operated at a uniform speed. The relative durations of the high-speed and reduced-speed operations can be varied by a suitable choice in the shape of the cam groove 51 while the absolute durations can be varied by changing the operating speed of the programmer 53. Operation is similar to that previously described for FIGURES 1–3 save that the changes in speed are not sudden because the high and low lobes of the cam groove must be joined by transition slopes.

Although the foregoing illustrated a cam arrangement having extended dwells at the maximum and minimum gear ratios, the invention is not limited thereto; for example, the cam may be shaped to consist of three parts, respectively rising and falling surfaces and one providing for prolonged low-speed operation. It is evident that gradual or even continuous changes in shaft speed can also be applied to the embodiment shown in FIGURE 1 by employing other electrical circuit elements, such as a continuously variable resistor element or by using a greater number of segments and resistors than there shown.

Referring to FIGURES 5 and 6, there is shown a statorless rotating disc contactor comprising a vertical cylindrical shell 55, circular in cross section, having upper and lower closures 56 and 57, upper and lower inlet pipes 58 and 59 which may optionally be tangential as shown, and upper and lower discharge pipes 60 and 61, respectively. The shell may be provided with egg-crate structures 62 and 63 to dampen rotary motion in the terminal zones and, adjacent thereto, flat annular baffles 64 and 65, having large central openings and situated adjacent the tangential inlets. A rotor shaft 66 is mounted in top and bottom bearings 67 and 68 and may be encased within the terminal zones in stationary sheaths 69 and 70. The shaft is coupled to a variable-speed electric driving motor 17, and reference numbers 17 and 30–42 denote parts described previously for FIGURE 1.

The shaft 66 carries a plurality of transverse, horizontal rotor discs 71, fixed at intervals along the shaft for rotation therewith within the otherwise uninterrupted chamber defined by the shell 55 between the baffles 64 and 65. These discs subdivide the chamber into contacting compartments. Each disc may be formed of a flat plate which is circular in outline, extends radially to the close proximity of the shell wall to provide only a very narrow annular clearance, and has a plurality of openings 72, to establish intercommunication between adjacent compartments. These openings are advantageously positioned so that over half of the total open area lies within the inner half of the area (i.e., within a circle having a diameter 0.71 of the internal diameter of the shell). Typically, the total open area (including the annular slit) is between 40 and 60 percent of the cross sectional area of the shell and narrow slits, with areas less than 5% of the said cross sectional area are preferred. A suitable axial interval between discs is from 5 to 50 percent of the shell diameter.

Operation of the contactor of FIGURES 5 and 6 is similar to that previously described, with the difference that the phases admitted via the inlets 58 and 59 form toroidal vortex patterns T within each compartment without the aid of stator baffles. These patterns are formed by flow of the phases outwards toward the shell wall adjacent to the rotor discs, reversing direction near the shell wall, and moving toward the shaft at the mid-level of each compartment. Superimposed on the vortical flow, there is a circular flow of fluids about the shaft in the same direction as the shaft rotation, indicated by dots (denoting arrow points) and crosses (denoting arrow tails) when the shaft is rotated in the direction of the arrow 73. This circular flow is retarded by the shell wall, creating shear in the fluids and leading to the continued formation of new interface between the continuous and the dispersed phase.

As in the first embodiment, when the rotor is operated at a selected constant speed either poor contacting or back-mixing is often encountered, and this is overcome by operation of the motor at a variable speed, with the aid of the controller 33, in the manner described.

I claim as my invention:

1. In the method of mixing fluids that are at least partially immiscible which comprises flowing said fluids through a vertically elongated vessel containing a plurality of transverse, axially spaced, baffles defining a series of consecutively communicating compartments, and a rotor shaft extending through said vessel and carrying at least some of said baffles for rotation therewith, and rotating said shaft and the baffles carried thereby to form a dispersion of one of said fluids in the other, the improvement which comprises continually changing the rotational speed of said rotor shaft and baffles during the mixing process between alternating relatively higher and lower speeds sufficient to maintain said fluids as a dispersion.

2. Method according to claim 1 wherein said higher speed is substantially the flooding speed and the lower speed is less than one-half of said flooding speed.

3. In the method of mixing fluids that are at least partially immiscible which comprises flowing said fluids through a vertically elongated vessel containing a plurality of transverse, axially spaced, stator baffles having aligned openings therein and defining a series of consecutively communicating compartments, and a rotor shaft extending through said openings with ample radial clearances and carrying for rotation therewith a plurality of rotor baffles positioned within the respective compartments in axially spaced relation to the stator baffles, and rotating said shaft and rotor baffles to form a dispersion of one of said fluids in the other, the improvement which comprises continually changing the rotational speed of said rotor shaft and baffles during the mixing process between alternating relatively higher and lower speeds sufficient to maintain said fluids as a dispersion.

4. In the method of contacting liquids that are at least partially immiscible which comprises the steps of flowing said liquids through a vertically elongated vessel containing a plurality of transverse, axially spaced, baffles defining a series of consecutively communicating compartments, and a rotor shaft carrying at least some of said baffles for rotation therewith, and rotating said shaft and the baffles carried thereby to form a dispersion of one of said fluids in the other, the improvement which comprises controlling the speed of rotation of said shaft and baffles by repeating the following sequence of operations continually throughout the mixing process: operating said shaft at a high speed for a period sufficient to disrupt one of said liquids into drops substantially as small as equilibrium size for said high speed but not substantially longer than necessary to attain said size and operating said shaft at a low speed less than half of said high speed for an extended period during which said one liquid remains dispersed in the other and mass transfer between said liquids continues.

5. Method according to claim 4 wherein said high speed is between 0.85 and 1.1 of the flooding speed.

6. Method according to claim 5 wherein said low speed is between one-twentieth and one-fifth of said flooding speed.

7. Method according to claim 6 wherein said high-speed operation is maintained for a period between about 5 seconds and one minute and said low-speed operation is maintained for a period between about one-half and twenty times the said period of high-speed operation.

References Cited in the file of this patent

UNITED STATES PATENTS

| | | |
|---|---|---|
| 2,161,847 | Blodgett | June 13, 1939 |
| 2,457,533 | Dehuff | Dec. 28, 1948 |
| 2,457,612 | Thiel | Dec. 28, 1948 |
| 2,601,674 | Reman | June 24, 1952 |
| 2,782,012 | Coyne et al. | Feb. 19, 1957 |